(12) United States Patent
Cohen

(10) Patent No.: US 9,074,730 B2
(45) Date of Patent: Jul. 7, 2015

(54) METHOD FOR DISPENSING COMPRESSED GASES

(71) Applicant: Air Products and Chemicals, Inc., Allentown, PA (US)

(72) Inventor: Joseph Perry Cohen, Bethlehem, PA (US)

(73) Assignee: AIR PRODUCTS AND CHEMICALS, INC., Allentown, PA (US)

( * ) Notice: Subject to any disclaimer, the term of this patent is extended or adjusted under 35 U.S.C. 154(b) by 265 days.

(21) Appl. No.: 13/826,616

(22) Filed: Mar. 14, 2013

(65) Prior Publication Data

US 2014/0261864 A1 Sep. 18, 2014

(51) Int. Cl.
   *F17C 5/06* (2006.01)

(52) U.S. Cl.
   CPC ............ *F17C 5/06* (2013.01); *F17C 2250/032* (2013.01); *F17C 2227/043* (2013.01); *Y02E 60/321* (2013.01)

(58) Field of Classification Search
   CPC .. F17C 5/06; F17C 2227/04; F17C 2227/041; F17C 2227/042; F17C 2227/043; F17C 2250/03; F17C 2250/032
   USPC .......................... 141/3, 4, 67, 94, 95, 192, 234
   See application file for complete search history.

(56) References Cited

U.S. PATENT DOCUMENTS

| | | | |
|---|---|---|---|
| 4,582,100 A * | 4/1986 | Poulsen | 141/4 |
| 5,107,906 A * | 4/1992 | Swenson et al. | 141/11 |
| 5,409,046 A * | 4/1995 | Swenson et al. | 141/11 |
| 5,513,678 A | 5/1996 | Schultz et al. | |
| 5,901,758 A * | 5/1999 | Hwang et al. | 141/2 |
| 6,382,227 B1 | 5/2002 | Birch et al. | |
| 7,128,103 B2 * | 10/2006 | Mitlitsky et al. | 141/248 |
| 7,575,012 B2 * | 8/2009 | Miki et al. | 137/1 |
| 7,921,883 B2 * | 4/2011 | Cohen et al. | 141/49 |
| 8,286,670 B2 * | 10/2012 | Faudou et al. | 141/4 |
| 2005/0056661 A1 * | 3/2005 | Casamatta et al. | 222/3 |
| 2007/0186982 A1 * | 8/2007 | Cohen et al. | 137/487.5 |
| 2012/0318403 A1 | 12/2012 | Cohen et al. | |
| 2014/0261863 A1 * | 9/2014 | Cohen et al. | 141/4 |

FOREIGN PATENT DOCUMENTS

| | | |
|---|---|---|
| EP | 1559949 A1 | 8/2005 |
| JP | 2004084808 A | 3/2004 |
| JP | 2005273811 A | 10/2005 |
| JP | 2008232979 A | 10/2008 |
| JP | 2011033146 A | 2/2011 |

* cited by examiner

*Primary Examiner* — Timothy L Maust

(74) *Attorney, Agent, or Firm* — Bryan C. Hoke, Jr.

(57) ABSTRACT

Method for dispensing a compressed gas to receiving vessels wherein a threshold pressure of compressed gas needed to supply the dispensing system is calculated, the threshold pressure depending on the anticipated time-averaged dispensing rate for a time period. Compressed gas is passed from a plurality of supply vessels, for example a tube trailer, to a plurality of storage vessels, and dispensed from the plurality of storage vessels to a plurality of receiving vessels. The supply vessel providing the compressed gas is required to have a compressed gas pressure greater than the calculated threshold pressure.

2 Claims, 1 Drawing Sheet

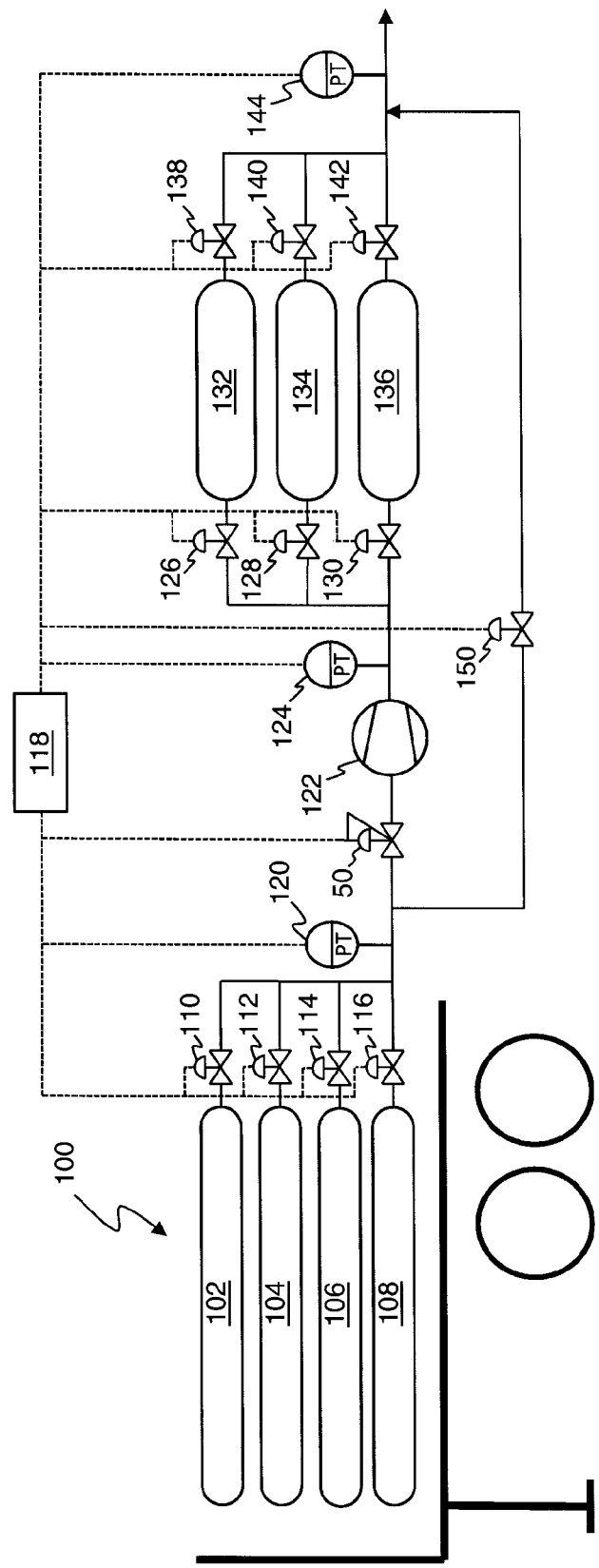

METHOD FOR DISPENSING COMPRESSED GASES

CROSS-REFERENCE TO RELATED APPLICATIONS

This patent application is related to U.S. patent application Ser. No. 13/826,494, entitled "Method for Dispensing Compressed Gases," contemporaneously filed on 14 Mar. 2013.

BACKGROUND

The present invention relates to a method for delivering a compressed gases, such as hydrogen or another compressed gas, to a receiving tank, such as a vehicle fuel tank. Although the invention is discussed herein with regard to delivery of compressed hydrogen gas to fuel tanks of hydrogen-powered vehicles, persons skilled in the art will recognize that the invention has other applications. For example, it may be used to deliver other compressed gases which may or may not be used as fuels, and the compressed gases may be delivered to various types of receiving tanks other than vehicle fuel tanks.

Hydrogen compressed gas is oftentimes supplied through the use of tube trailers. Tube trailers may be filled at a supply depot, offloaded via a compressed gas dispensing station, and return to the supply depot for refilling.

Industry desires to deliver hydrogen and other compressed gases at high pressures, often exceeding the pressure of compressed gas in the tube trailers. The compressed gas from the tube trailer may be compressed further to storage vessels at a compressed gas dispensing station to high pressure compressed gas for dispensing to receiving vessels.

Industry also desires to suitably provide compressed gas to receiving vessels, such that the receiving vessels obtain a sufficient and/or desired charge of compressed gas at any and all times, by maintaining storage vessels of a dispensing station at suitably high pressures.

BRIEF SUMMARY

The present invention relates to a method for dispensing a compressed gas.

There are several aspects of the method as outlined below.

Aspect 1. A method for dispensing a compressed gas, the method comprising:
selecting a desired time-averaged dispensing rate for a first time period;
calculating a threshold pressure of the compressed gas needed to supply a compressor to meet the desired time-averaged dispensing rate;
withdrawing a first quantity of compressed gas from at least one supply vessel of a plurality of supply vessels, and passing the first quantity of compressed gas to a storage vessel of a plurality of storage vessels via the compressor, wherein the pressure of the first quantity of compressed gas when withdrawn from the at least one supply vessel of the plurality of supply vessels is greater than the threshold pressure for at least 90% of the first time period; and
dispensing the first quantity of compressed gas from the storage vessel of the plurality of storage vessels into one or more receiving vessels.

Aspect 2. The method of aspect 1 wherein at the start of the first time period, the compressed gas is withdrawn from a first supply vessel of the plurality of supply vessels, wherein the first supply vessel has a compressed gas pressure which is the lowest pressure of any other supply vessel of the plurality of supply vessels having a compressed gas pressure greater than the threshold pressure.

BRIEF DESCRIPTION OF SEVERAL VIEWS OF THE DRAWINGS

The sole FIGURE illustrates a compressed gas supply system.

DETAILED DESCRIPTION OF THE PREFERRED EMBODIMENTS

The ensuing detailed description provides preferred exemplary embodiments only, and is not intended to limit the scope, applicability, or configuration of the invention. Rather, the ensuing detailed description of the preferred exemplary embodiments will provide those skilled in the art with an enabling description for implementing the preferred exemplary embodiments of the invention, it being understood that various changes may be made in the function and arrangement of elements without departing from scope of the invention as defined by the claims.

The articles "a" and "an" as used herein mean one or more when applied to any feature in embodiments of the present invention described in the specification and claims. The use of "a" and "an" does not limit the meaning to a single feature unless such a limit is specifically stated. The article "the" preceding singular or plural nouns or noun phrases denotes a particular specified feature or particular specified features and may have a singular or plural connotation depending upon the context in which it is used. The adjective "any" means one, some, or all indiscriminately of whatever quantity. The term "and/or" placed between a first entity and a second entity means one of (1) the first entity, (2) the second entity, and (3) the first entity and the second entity. The term "and/or" placed between the last two entities of a list of 3 or more entities means at least one of the entities in the list including any specific combination of entities in this list.

As used herein, the term "plurality" means two or more.

Unless otherwise noted, all pressure values used herein are gauge pressures.

In the claims, letters may be used to identify claimed steps (e.g. (a), (b), and (c)). These letters are used to aid in referring to the method steps and are not intended to indicate the order in which claimed steps are performed, unless and only to the extent that such order is specifically recited in the claims.

For the purposes of simplicity and clarity, detailed descriptions of well-known devices, circuits, and methods are omitted so as not to obscure the description of the present invention with unnecessary detail.

The present invention relates to a method for dispensing a compressed gas to receiving vessels.

As used herein, the term "compressed gas" encompasses supercritical fluids and pressurized gases (gases at a pressure greater than 1 atm. (absolute) and less than the critical pressure of the gas or a temperature less than the critical temperature of the gas). The compressed gas may be a single species or a mixture of species. The compressed gas may be hydrogen. The compressed gas may be natural gas.

Receiving vessels may be any vessels suitable for receiving the compressed gas, for example vessels in cars, trucks, forklifts, or other vehicles which use the compressed gas.

The method will be better understood with reference to the FIGURE, where the FIGURE shows an apparatus suitable for carrying out the method.

The apparatus comprises a tube trailer 100. The tube trailer comprises a plurality of supply vessels 102, 104, 106, and 108 and associated valves 110, 112, 114, and 116. The tube trailer comprises at least two supply vessels and may comprise any suitable number of supply vessels greater than two. While shown as a single supply vessel 102, supply vessel 102 may be a tube bank comprising two or more vessels which are connected by a manifold with flow from the tube bank controlled by valve 110. Likewise supply vessels 104, 106, and 108 may each be a tube bank, each connected by a manifold with flow from each tube bank controlled by its respective valve 112, 114, and 116.

Compressed gas may be delivered to a compressed gas dispensing station via the tube trailer 100. The tube trailer may be filled at a supply depot, offloaded via the compressed gas dispensing station, and returned to the supply depot for refilling.

Multiple tube trailers may be used as described in U.S. Pat. Nos. 4,380,242, and 4,139,019, and U.S. patent application Ser. No. 12/785,761, each incorporated herein by reference to the extent that the disclosure therein does not conflict with the teachings of the present application.

The apparatus also comprises a pressure transmitter 120, pressure regulator valve 50, and compressor 122.

The pressure transmitter 120, pressure regulator valve 50 and compressor are typically part of the compressed gas dispensing station, which may be at a fixed location. Alternatively, the compressed gas dispensing station may be a mobile compressed gas dispensing station. The pressure transmitter 120 may alternatively be part of the tube trailer.

The compressor may be any suitable compressor for the dispensing application, for example, a Hydro-pak Inc. FLEXI-POWER™ compressor. Suitable compressors are commercially available and the skilled person can readily select suitable compressors.

The pressure regulator valve 50 is used to ensure that the input pressure to the compressor does not exceed the maximum allowable input pressure for the compressor. The pressure regulator valve has a set point pressure, which may be set by a user. The pressure regulator valve tries to maintain the pressure leaving the valve at the set point pressure while the input pressure varies. In case the input pressure to the pressure regulator valve is less than the set point pressure, the pressure regulator valve will move to the full open position so that the output pressure from the pressure regulator valve is substantially the same as the input pressure.

When the tube trailer first arrives at the dispensing station from a supply depot, the plurality of supply vessels 102, 104, 106, and 108 should be at full capacity, and at a pressure much greater than the maximum allowable pressure to the compressor, for example about 50 MPa. The maximum allowable pressure to the compressor depends on the compressor selected and may be, for example, slightly more than about 20 MPa. Then the set point pressure for the pressure regulator valve 50 may be set to 20 MPa.

The apparatus also comprises a plurality storage vessels 132, 134, and 136. The plurality of storage vessels comprise at least two storage vessels and may comprise any suitable number of supply vessels greater than two. While shown as a single storage vessel 132, storage vessel 132 may be a tube bank comprising two or more vessels which are connected by a manifold with flow to the tube bank controlled by valve 126 and flow from the tube bank controlled by valve 138. Likewise, storage vessel 134 may be a tube bank, connected by a manifold with flow to and from tube bank controlled by valves 128, and 140, respectively, and storage vessel 136 may be a tube bank, connected by a manifold with flow to and from tube bank controlled by valves 130, and 142, respectively.

Compressed gas from a supply vessel 102, 104, 106, or 108 passes through pressure regulator valve 50 to compressor 122. The pressure in each of supply vessels may be monitored by pressure transmitter 120 when the compressed gas is passed from each respective vessel. Alternatively, the pressure in each of the supply vessels may be monitored by separate pressure transmitters mounted to each respective supply vessel. The discharge pressure from compressor 122 may be monitored by pressure transmitter 124. Compressed gas is passed to a storage vessel of the plurality of storage vessels 132, 134, and 136.

The plurality of storage vessels may be filled according to the method described in U.S. patent application Ser. No. 13/162,739, incorporated herein by reference.

The plurality of storage vessels 132, 134, and 136 may be selectively filled using valves 126, 128, and 130. The pressure in each of the plurality of storage vessels may be monitored by pressure transmitters (not shown) in each of storage vessels 132, 134, and 136, or by recording the pressure at the discharge pressure of the compressor by pressure transmitter 124 any time the fill valve is open, or by monitoring the dispenser supply pressure by pressure transmitter 144 any time one of the dispenser cascade valves 138, 140, or 142 are opened.

Compressed gas is passed from the plurality of storage vessels 132, 134, and 136 via conduit 148 to receiving vessels (not shown), typically using the known cascade technique, where compressed gas is withdrawn from a storage vessel having a lower compressed gas pressure and subsequently withdrawn from a storage vessel having a higher compressed gas pressure.

Compressed gas may also be passed directly from a supply vessel to a receiving vessel via bypass valve 150, without being passed through the regulator valve 50, compressor 122, and any of the plurality of storage vessels 132, 134 and 136. Compressed gas may bypass the compressor in case the compressed gas in any of the supply vessels is greater than the receiving vessel.

The operation of the valves to control the flow from the supply vessel to the storage vessels, and from the storage vessels to the receiving vessels is controlled by controller 118. Controller 118 may be any suitable controller, for example, a computer, PLC, and the like. Controller 118 may receive input signals from pressure transmitters 120, 124 and 144. Controller 118 may send signals to open or close valves 110, 112, 114, 116, 126, 128, 130, 138, 140, and 142. Valves 110, 112, 114, 116, 126, 128, 130, 138, 140, and 142 may be actuated by any known means, for example, electrically actuated and pneumatically actuated.

The inventors have recognized that to ensure that the receiving vessels obtain a sufficient and/or desired charge of compressed gas, the supply pressure of compressed gas from the supply vessel to the compressor must be sufficiently high in order to meet the dispensing rate requirements.

The method comprises selecting a desired time-averaged dispensing rate for a first time period.

The time-averaged dispensing rate is the total amount of compressed gas dispensed during a specified time period (for example, in units of kg) divided by the length of the time period (for example, in units of hours). For example, when 20 kg is dispensed in a time period of 2 hours, the resulting time-averaged dispensing rate is 10 kg/h.

The method also comprises calculating a threshold pressure of the compressed gas needed to supply compressor 122 to meet the desired time-averaged dispensing rate. The threshold pressure needed to supply the compressor to meet a desired time-averaged dispensing rate may be calculated.

The flow rate through a compressor may be approximated by a linear function of the inlet suction pressure up to maximum allowable inlet suction pressure, e.g. $F = A \times P_{suction} + B$, where F is flow rate through the compressor, $P_{suction}$ the inlet suction pressure, and A and B are parameters characterizing the relationship between inlet suction pressure and flow rate for the compressor. For example for a Hydro-pak Inc. FLEXI-POWER™ compressor, A=14.296 and B=26.378 where the flow rate has units of grams $H_2$/minute and the inlet suction pressure has units of MPa.

The relationship between the flow rate and the inlet suction pressure may be rewritten for calculating the threshold pressure, where the inlet suction pressure is the threshold pressure and the flow rate is the desired flow rate. Then $P_{threshold} = (F-B)/A$, where $P_{threshold}$ has units of MPa and F has units of grams $H_2$/minute. The desired flow is the expected average station usage flow during the moderate use period in grams $H_2$/minute. This equation is based in the performance of a particular Hydro-pak Inc. FLEXI-POWER™ compressor. The equation would be modified to fit the flow of the actual compressor used at an actual station.

The method comprises withdrawing a first quantity of gas from at least one supply vessel of the plurality of supply vessels 102, 104, 106, and 108, and passing the first quantity of compressed gas to a storage vessel of the plurality of storage vessels 132, 134, and 136 via compressor 122. According to the method, the pressure of the first quantity of compressed gas when withdrawn from the at least one supply vessel is greater than the calculated threshold pressure for at least 90% of the first time period. The first quantity of gas may be withdrawn from a supply vessel having the lowest compressed gas pressure greater than the threshold pressure when the first quantity of compressed gas is initially withdrawn from the supply vessel. Withdrawing compressed gas from the supply vessel having the lowest compressed gas pressure greater than the threshold pressure has the benefit since it allows maximum transfer of gas from the supply vessels to the receiving vessels.

Withdrawing compressed gas from a supply vessel having a compressed gas pressure greater than the threshold pressure ensures that at least one storage vessels of the plurality of storage vessels 132, 134, 136 will have compressed gas at a sufficient pressure to supply the expected receiving vessels with a desired charge of compressed gas.

The method comprises dispensing the first quantity of compressed gas from the storage vessel into one or more receiving vessels (not shown).

Dispensing of the first quantity of compressed gas to one or more receiving vessels may take place at any time after the first quantity of compressed gas has been passed to the storage vessel receiving the first quantity of compressed gas. Dispensing of the first quantity of gas from a storage vessel to a receiving vessel may be contemporaneous with passing of the first quantity from a supply vessel to the storage vessel, but typically will be subsequent to the passing of the first quantity from a supply vessel to the storage vessel.

EXAMPLE

The hydrogen fueling station in this example has four 2000 liter supply vessels that have a pressure of 52 MPa when full. The station will have three storage vessels of 340 liters each that will have a pressure of 90 MPa when full, and that may be used until the pressure goes down to 50 MPa.

When a trailer carrying the supply vessels first arrives from a supply depot, the pressure in all four source vessels is 52 MPa. As the compressor draws gas from a source vessel and transfers the compressed hydrogen gas to a storage vessel, the gas pressure in the source vessel will go down.

The compressor draws hydrogen from a first of the supply vessels until the pressure in the first of the supply vessels decreases below 20 MPa (the maximum inlet suction pressure for the compressor and the set point pressure of the pressure regulator valve). When the pressure in at least one supply vessel is between 3 and 20 MPa, the compressor will draw hydrogen from a specific supply vessel depending on the expected average (mean) station dispensing rate. For example, if the station is expected to fill one vehicle per hour where the vehicle has a 5 kg hydrogen capacity, then the threshold pressure will be 4 MPa. If the station is expected to fill three vehicles per hour, each vehicle having a 5 kg hydrogen capacity, then the threshold pressure will be 15.6 MPa.

This protocol provides for maximum utilization of the supply vessels while keeping up with customer usage rates.

The invention claimed is:

1. A method for dispensing a compressed gas, the method comprising:
    selecting a desired time-averaged dispensing rate for a first time period;
    calculating a threshold pressure of the compressed gas needed to supply a compressor to meet the desired time-averaged dispensing rate;
    withdrawing a first quantity of compressed gas from at least one supply vessel of a plurality of supply vessels, and passing the first quantity of compressed gas to a storage vessel of a plurality of storage vessels via the compressor, wherein the pressure of the first quantity of compressed gas when withdrawn from the at least one supply vessel of the plurality of supply vessels is greater than the threshold pressure for at least 90% of the first time period; and
    dispensing the first quantity of compressed gas from the storage vessel of the plurality of storage vessels into one or more receiving vessels.

2. The method of claim 1 wherein at the start of the first time period, the compressed gas is withdrawn from a first supply vessel of the plurality of supply vessels, wherein the first supply vessel has a compressed gas pressure which is the lowest pressure of any other supply vessel of the plurality of supply vessels having a compressed gas pressure greater than the threshold pressure.

* * * * *